United States Patent [19]
Matsushima

[11] Patent Number: 5,976,086
[45] Date of Patent: Nov. 2, 1999

[54] ULTRASONIC DIAGNOSTIC APPARATUS AND FILTER TO OBTAIN SEQUENTIAL FRAMES OF IMAGE DATA

[75] Inventor: Tetsuya Matsushima, Kawasaki, Japan

[73] Assignee: Fujitsu Limited, Kawasaki, Japan

[21] Appl. No.: 08/935,960

[22] Filed: Sep. 23, 1997

[30] Foreign Application Priority Data

Apr. 15, 1997 [JP] Japan ................... 9-097458

[51] Int. Cl.$^6$ ............................ A61B 10/00
[52] U.S. Cl. ............................ 600/443; 600/437
[58] Field of Search ....................... 600/443, 441, 600/437; 382/6, 54

[56] References Cited

U.S. PATENT DOCUMENTS

| | | | |
|---|---|---|---|
| 4,785,818 | 11/1988 | Hardin | 600/443 |
| 5,357,580 | 10/1994 | Forestieir et al. | 382/6 |

*Primary Examiner*—Marvin M. Lateef
*Assistant Examiner*—Ali M. Imam
*Attorney, Agent, or Firm*—Staas & Halsey

[57] ABSTRACT

There is provided an ultrasonic diagnostic apparatus in which transmission of ultrasonic waves into the subject and reception of the ultrasonic waves reflected within the subject are repeatedly performed to obtain a plurality of sequentially continued frames of image data, and a dynamic image is displayed in accordance with the image data thus obtained. According to the ultrasonic diagnostic apparatus, image data, which is transmitted to a storage unit for the purpose of an average arithmetic operation for the successive frame K+1, is selected for each pixel I from between two types of image data of an averaging image data B (K, I) after an average arithmetic operation processing and a new frame of image data A (K, I) before the average arithmetic operation processing. Thus, both the reduction of noises and the tracking ability to the movement are implemented with greater satisfaction.

11 Claims, 8 Drawing Sheets

(A)

(B)

$t_0$ $t_2$ $t_4$ $t_6$ $t_8$ $t_{10}$ $t_{12}$ $t_{14}$ $t_{16}$ $t_{18}$ $t_{20}$ $t_{22}$ $t_{24}$ $t_{26}$ $t_{28}$ $t_{30}$
$t_1$ $t_3$ $t_5$ $t_7$ $t_9$ $t_{11}$ $t_{13}$ $t_{15}$ $t_{17}$ $t_{19}$ $t_{21}$ $t_{23}$ $t_{25}$ $t_{27}$ $t_{29}$

Fig.6
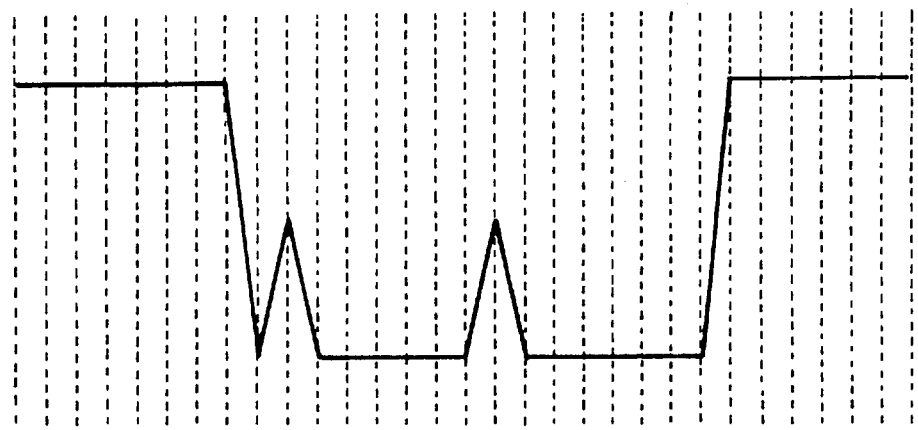
(A)
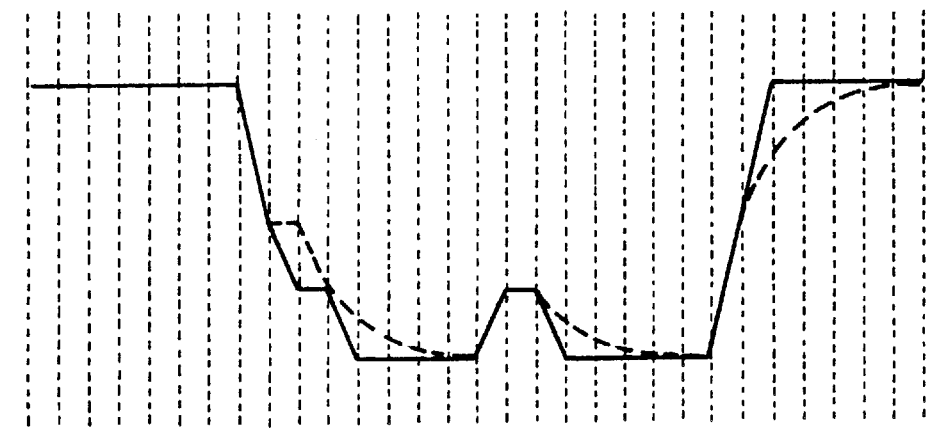
(B)
$t_0$ $t_2$ $t_4$ $t_6$ $t_8$ $t_{10}$ $t_{12}$ $t_{14}$ $t_{16}$ $t_{18}$ $t_{20}$ $t_{22}$ $t_{24}$ $t_{26}$ $t_{28}$ $t_{30}$
$t_1$ $t_3$ $t_5$ $t_7$ $t_9$ $t_{11}$ $t_{13}$ $t_{15}$ $t_{17}$ $t_{19}$ $t_{21}$ $t_{23}$ $t_{25}$ $t_{27}$ $t_{29}$

ULTRASONIC DIAGNOSTIC APPARATUS AND FILTER TO OBTAIN SEQUENTIAL FRAMES OF IMAGE DATA

BACKGROUND OF THE INVENTION

1. Field of the Invention

The present invention relates to an ultrasonic diagnostic apparatus in which transmission of ultrasonic waves into the subject and reception of the ultrasonic waves reflected within the subject are repeatedly performed to obtain a plurality of sequentially continued frames of image data, and dynamic images are displayed in accordance with the image data thus obtained, and also relates to a filter suitable for being incorporated into the ultrasonic diagnostic apparatus.

2. Description of the Related Art

Hitherto, there has been widely used an ultrasonic diagnostic apparatus for the purpose of diagnoses of a disease.

FIG. 7 is a block diagram showing the basic arrangement of constituents of an ultrasonic diagnostic apparatus by way of example. There will be described an outline of the ultrasonic diagnostic apparatus referring to this block diagram.

First, there will be described a structure of the ultrasonic diagnostic apparatus hereinafter.

A main frame 10 of the ultrasonic diagnostic apparatus comprises a control unit 100, an analog processing unit 200, a digital scan converter unit 300, a Doppler processing unit 400, a display control unit 500 and an organism signal amplifier unit 600. The control unit 100 comprises a CPU 101 and a beam scan control unit 102. Connected to the CPU 101 are a control panel 701, a unitary body of touch panel 702 and EL display 703, and a floppy disk device 704.

The analog processing unit 200 comprises a transmit-receive unit 201, a receive delay control unit 202, a beam-former unit 203, a control interface unit 204, an analog signal processing unit 205 and a Doppler signal processing unit 206. The control interface unit 204, the transmit-receive unit 201, the receive delay control unit 202, and the Doppler signal processing unit 206 are connected to one another via a control line 207. Further, the control interface unit 204 is connected via a control line 208 to the analog signal processing unit 205. The receive delay control unit 202 and the beamformer unit 203 are connected to one another via a control line 209. Detachably connected to the transmit-receive unit 201, which constitutes the analog processing unit 200, is an ultrasonic probe 20, by the maximum, four pieces of ultrasonic probe 20.

The digital scan converter unit 300 comprises a black-and-white scan converter 301, a color scan converter 302 and a scroll scan converter 303.

The Doppler processing unit 400 comprises a pulse/continuous wave Doppler analyzing unit 401 and a color Doppler analyzing unit 402.

The display control unit 500 is illustrated with a single block. Connected to the display control unit 500 are a printer 705, a VTR (Video Tape Recorder) 706, an observation television monitor 707 and a speaker 708.

The organism signal amplifier unit 600 is also illustrated with a single block. Connected to the organism signal amplifier unit 600 are an ECG electrode unit 709, a heart sound microphone 710 and a pulse wave transducer 711.

The ultrasonic diagnostic apparatus further comprises a power source unit 800 connected to a commercial power supply for supplying necessary power to individual sections of the ultrasonic diagnostic apparatus.

The main frame 10 has a CPU bus 901 for connecting the CPU 101 and the beam scan control unit 102, which constitute the control unit 100, the control interface unit 204, which constitutes the analog processing unit 200, the black-and-white scan converter 301, the color scan converter 302 and the scroll scan converter 303, which constitute the digital scan converter unit 300, the pulse/continuous wave Doppler analyzing unit 401 and the color Doppler analyzing unit 402, which constitute the Doppler processing unit 400, and the display control unit 500 with each other. The main frame 10 further has an echo bus 902 for supplying image data generated from the analog signal processing unit 205, which constitutes the analog processing unit 200, to the digital scan converter unit 300. With respect to data generated from the pulse/continuous wave Doppler analyzing unit 401 and the color Doppler analyzing unit 402, which constitute the Doppler processing unit 400, such data are also supplied through the echo bus 902 to the digital scan converter unit 300. The main frame 10 further has a video bus 903 for transmitting a video signal generated from anyone of the black-and-white scan converter 301, the color scan converter 302 and the scroll scan converter 303, which constitute the digital scan converter unit 300, to the display control unit 500.

The control panel 701 consists of a keyboard, etc. having a number of keys arranged. When the control panel 701 is operated, operation information is detected by the CPU 101, so that an instruction associated with the operation information is transmitted to the beam scan control unit 102, the control interface unit 204, the digital scan converter unit 300, or the display control unit 500 in accordance with the the instruction.

The EL display unit 703 has a liquid-crystal display screen. The CPU 101 serves as an EL line drawing generating unit for generating an EL line drawing to be displayed on the liquid-crystal display screen of the EL display unit 703, too. The EL line drawing generated in the CPU 101 is displayed on the liquid-crystal display screen of the EL display unit 703. The liquid-crystal display screen of the EL display unit 703 is provided with the touch panel 702. When an operator touches the touch panel 702 by his fingers, position information representative of the associated touched position on the touch panel 702 is transmitted to the CPU 101. The touch panel 702 and the EL display unit 703 are arranged, so that various types of instructions to the ultrasonic diagnostic apparatus can be readily inputted, in such a manner that, for instance, when it is instructed to the ultrasonic diagnostic apparatus through an operation of the control panel 701 that a parameter as to a certain mode is set up for the ultrasonic diagnostic apparatus, the CPU 101 causes the EL display unit 703 to display a table of a number of parameters to be set up for the selected mode, so that an operator touches the touch panel 702 by his fingers to set up a desired parameter.

The floppy disk device 704 is a device onto which a floppy disk (not illustrated) is detachably loaded, wherein the loaded floppy disk is accessed. The CPU 101 causes instructions made by an operator through an operation of the control panel 701 and the touch panel 702 to be written into the floppy disk loaded onto the floppy disk device 704. When the power supply of the ultrasonic diagnostic apparatus is turned on, or when a reset to the initial state is instructed through an operation of the control panel 701, various types of instruction information, which are stored in the floppy disk device 704 loaded onto the floppy disk device 704, are read out therefrom and fed to the CPU 101 so that the CPU 101 sets up the individual sections of the ultrasonic-diagnostic apparatus to the initial state in accordance with the instruction information. There will exist a number of parameters to be set up by an operator through an operation of the control panel 701 and the touch panel 702, which are needed when the ultrasonic diagnostic apparatus is operated. It will be very troublesome for the operator to do over again a setting of such a number of parameters, for example, whenever the power supply turns on. For this reason, parameters of the initial state, etc. are written in the floppy disk beforehand, and when the power supply of the ultrasonic diagnostic apparatus is turned on, or when a reset to the initial state is instructed, the parameters and the like stored in the floppy disk are read out therefrom to set up the individual sections of the ultrasonic diagnostic apparatus in accordance with the parameters and the like thus read, thereby contributing to an enhancement of efficiency in setting the parameters and the like.

The CPU 101, which constitutes the control unit 100, mainly serves as a man-machine interface, as mentioned above. On the other hand, the beam scan control unit 102, which also constitutes the control unit 100, is mainly in charge of the control, for example, of timing of transmit and receive of ultrasonic waves in the ultrasonic diagnostic apparatus, which needs an operational ability on a real-time basis. According to this type of ultrasonic diagnostic apparatus, when transmit and receive of ultrasonic waves are performed, control signals of controlling the individual sections constituting the analog processing unit 200 are transmitted from the beam scan control unit 102 through the CPU bus 901 to the control interface unit 204, so that the control interface unit 204 controls via a control line 207 the transmit-receive unit 201, the receive delay control unit 202, and the Doppler signal processing unit 206. Further, the control interface unit 204 controls via a control line 208 the analog signal processing unit 205. The receive delay control unit 202 controls the beamformer unit 203 via the control line 209 under control of the control interface unit 204.

The transmit-receive unit 201 is coupled to the ultrasonic probe 20. With respect to the ultrasonic probe, there exist, for example, a linear scan type of ultrasonic probe, a convex scan type of ultrasonic probe, and a sector scan type of ultrasonic probe. As an especial type of ultrasonic probe, there is a type of ultrasonic probe to be inserted into a body cavity. Further, with respect to those various types of ultrasonic probes, there exist many types of ultrasonic probes, which may be classified in accordance with a difference in frequency of the ultrasonic waves to be used. In order that a ultrasonic probe is loaded on the main frame 10, a connector (not illustrated) is used. The main frame 10 end is provided with four connectors adapted to be connected to ultrasonic probes. Thus, as mentioned above, it is possible to simultaneously load onto the connectors the ultrasonic probes, by the maximum 4 pieces, of the above-mentioned various types of ultrasonic probes. When a ultrasonic probe is loaded on the main frame 10, the main frame 10 may identify information as to which type of ultrasonic prob is loaded. Such information is transmitted via the control line 207, the control interface unit 204 and the CPU bus 901 to the CPU 101. On the other hand, the control panel 701 issues an instruction as to which ultrasonic probe is used among the ultrasonic probes connected to four connectors of the main frame 10 end, when the ultrasonic diagnostic apparatus is used. Such an instruction is transmitted via the CPU 101, the control interface unit 204 and the control line 207 to the transmit-receive unit 201. Upon receipt of the instruction, the transmit-receive unit 201 transmits high voltage pulses (which will be described latter) to the ultrasonic probe 20 thus indicated to generate ultrasonic waves, and receives signals which are received by the ultrasonic probe 20. Here, it is assumed that the ultrasonic probe 20, as shown in FIG. 7 by one, is selected for transmission and reception of ultrasonic waves.

On the tip of the ultrasonic probe 20, there are arranged a plurality of ultrasonic transducers 21, which are put to a surface of the subject 1 (particularly human body). In this condition, high voltage pulses for transmission and reception of ultrasonic waves are applied from the transmit-receive unit 201 to the plurality of ultrasonic transducers 21, respectively. The high voltage pulses applied to the plurality of ultrasonic transducers 21 are controlled in a relative time difference under control of the control interface unit 204. Ultrasonic pulse beams are transmitted from the plurality of ultrasonic transducers 21 along anyone of a plurality of scan lines 2 extending to the inside of the subject 1 in such a manner that the focus of the ultrasonic pulse beams is adjusted on a predetermined depth position inside of the subject 1 in accordance with a control of the relative time difference as to the application of the high voltage pulses to the plurality of ultrasonic transducers 21. The ultrasonic pulse beam is reflected on the individual points on the one scan line during travelling inside the subject 1, and returns to the ultrasonic probe 20 so that the reflected ultrasonic waves are received by the plurality of ultrasonic transducers 21. A plurality of signals, which are obtained through receiving the reflected ultrasonic waves, are supplied to the transmit-receive unit 201 so as to be amplified by a plurality of preamplifiers (not illustrated) of the transmit-receive unit 201, and then fed to the beamformer unit 203. The beamformer unit 203 is provided with an analog delay line (not illustrated) having a number of center taps. The center taps are selected in operation to receive the plurality of signals transmitted from the transmit-receive unit 201 in accordance with a control of the receive delay control unit 202, whereby the plurality of signals are relatively delayed and added together in current. Controlling a relative delay pattern as to the plurality of signals may emphasize the reflected ultrasonic waves in the direction along the scan line identical with the scan line associated with the time of the ultrasonic wave transmission, and forms a so-called received beam in which the focus of the ultrasonic pulse beams is adjusted on a predetermined depth position inside of the subject 1. Since ultrasonic waves travel slowly inside of the subject 1 as compared with a rate of the signal processing, it is possible to implement a so-called dynamic focus in which the focus is sequentially shifted to the deeper position inside of the subject while receiving the ultrasonic waves along one scan line. In this case, the center taps of the analog delay line are switchingly selected by the receive delay control unit 202 in response to the signals sequentially obtained by the ultrasonic transducers, even during once receiving associated with once transmitting the ultrasonic pulse beam.

According to the above-mentioned explanation, the high voltage pulses are applied to the ultrasonic transducers 21 to transmit the ultrasonic pulse beam. In this case, as mentioned above, since ultrasonic waves travel slowly inside of the subject as compared with a rate of the signal processing, it is possible, through measuring time from a stating time of application of the high voltage pulses to the ultrasonic transducers 21 to a time of receive of the reflected ultrasonic waves by the ultrasonic transducers 21, to identify the signal obtained at that time concerned with receiving of the reflected ultrasonic waves with respect to the association of the reflected ultrasonic wave with the depth position inside of the subject. That is, the feature that the ultrasonic wave to be transmitted is shaped as a pulse may provide a resolution with respect to the depth direction of the subject. Usually, in this manner, the high voltage pulses are applied to the ultrasonic transducers 21. In the special case, however, on condition that it is permitted to have no resolution with respect to the depth direction of the subject, it happens that a continuously repetitive high voltage pulse train signal is applied to the ultrasonic transducers 21 to transmit ultrasonic beams in the form of a continuous wave.

Also hereinafter, the ultrasonic diagnostic apparatus will be explained on the assumption that a pulse-like shaped ultrasonic beam is transmitted, except for a case that when the pulse/continuous wave Doppler analyzing unit 401, which constitutes the Doppler processing unit 400, is explained, the continuous wave is referred to.

In the manner as mentioned above, the transmit-receive unit 201 and the beamformer unit 203 sequentially repeatedly perform transmission and reception of the ultrasonic pulse beams along each of a plurality of scan lines 2 inside of the subject 1, so that signals thus generated, each representative of the received beam along each of the scan lines, are sequentially fed to the analog signal processing unit 205. In the analog signal processing unit 205, the received analog signals are subjected to logarithmic compression, detection, and filtering processings, etc. according to a designation issued from the the control panel 701 as to which depth area inside of the subject 1 an image is to be displayed concerned with, that is, a designation as to whether it is sufficient that an image concerned with only the shallow area inside of the subject 1 is displayed, or a designation as to what degree of depth area an image is to be displayed concerned with. The analog signals thus processed are converted into digital of image data by an A/D converter unit. Image data outputted from the analog signal processing unit 205 are fed via the echo bus 902 to the black-and-white scan converter 301, which constitutes the digital scan converter unit 300. The black-and-white scan converter 301 converts the received image data to a video signal for a display, and then transmits the video signal for a display via the video bus 903 to the display control unit 500. The display control unit 500 causes the observation television monitor 707 to display a B-mode image caused by the ultrasonic reflection intensity distribution on the tomographic plane of the subject defined by a plurality of scan lines 2. At that time, if necessary, it is possible to display patient's names, photographing date, photographing conditions, etc. superposing on the B-mode image. As the B-mode image, it is possible to display a dynamic image representative of the state in which the inside of the subject 1 moves, a static image at a certain time, or an image in a certain phase of a movement of the heart of a human body, which is synchronized with the movement of the heart, in accordance with a synchronizing signal generated from the organism signal amplifier unit 600.

Connected to the organism signal amplifier unit 600 are the ECG electrode unit 709, the heart sound microphone 710 and the pulse wave transducer 711. The organism signal amplifier unit 600 generates the synchronizing signal in accordance with any one of these elements or a plurality of sensors, and transmits the same to the display control unit 500.

Connected to the display control unit 500 are the observation television monitor 707, and the printer 705 and the VTR 706 as well. The display control unit 500 outputs images displayed on the observation television monitor 707 to the printer 705 or the VTR 706 in accordance with an instruction from an operator.

Again, an explanation will be continued from the analog processing unit 200.

When it is desired to know time variation of information as to the reflection of ultrasonic waves on a certain one scan line extending to the inside of the subject, the ultrasonic waves are repeatedly transmitted and received along a certain one scan line of interest, and data representative of the received beam of the subject along the one scan line is transmitted via the echo bus 902 to the scroll scan converter 303. The scroll scan converter 303 generates a video signal representative of an image (an M-mode image) in which the ultrasonic reflection intensity distribution in the depth direction of the subject along the one scan line is given in the longitudinal direction, and the lateral axis consists of a time axis, wherein the image is scrolled in the time axis direction. The video signal thus generated is fed via the video bus 903 to the display control unit 500, so that an image based on the video signal is displayed, for example, on the observation television monitor 707.

The display control unit 500 has a function such that the video signal representative of the B-mode image transmitted from the black-and-white scan converter 301 and the video signal representative of the M-mode image transmitted from the scroll scan converter 303 are arranged side by side, and in addition a function such that a color mode image, which will be described later, is superposed on the B-mode image. The observation television monitor 707 is adapted to display thereon a plurality of images being arranged side by side in accordance with an instruction from an operator, alternatively display a plurality of images being superposed.

Again, returning to the explanation of the analog processing unit 200, the Doppler signal processing unit 206, which constitutes the analog processing unit 200, serves as a structure element for determining a blood flow distribution of the inside of the subject, or a blood flow distribution at a certain point or on a certain one scan line. In the Doppler signal processing unit 206, a signal representative of the received beam generated in the beamformer unit 203 is subjected to a so-called quadrature detection and in addition converted into digital data through an A/D conversion. The data, which has been subjected to the quadrature detection, is outputted from the Doppler signal processing unit 206, is fed to the Doppler processing unit 400. The Doppler processing unit 400 comprises the pulse/continuous wave Doppler analyzing unit 401 and the color Doppler analyzing unit 402. Here, it is assumed that the data outputted from the Doppler signal processing unit 206 is fed to the color Doppler analyzing unit 402. The color Doppler analyzing unit 402 determines data representative of a blood flow distribution on an area of interest (ROI) on the B-mode image, which is designated by an operator, by an autocorrelation operation based on data obtained through performing, for example, eight times of ultrasonic transmit and receive on each scan line. The data representative of a blood flow distribution on the area (ROI) is fed via the echo bus 902 to the color scan converter 302. The color scan converter 302 converts the data representative of a blood flow distribution on the area (ROI) into a video signal suitable for a display, and transmits the video signal to the display control unit 500. The display control unit 500 superposes a color mode image, in which a blood in a direction coming near the ultrasonic probe 20, a blood in a direction going away from the ultrasonic probe 20, and a blood velocity are represented by, for example, red, blue and luminance, respectively, on the area (ROI) of the B-mode image transmitted from the black-and-white scan converter 301, and causes those images to be displayed on the observation television monitor 707. Thus, it is possible to grasp the outline of the blood flow distribution on the area (ROI).

When an operator inputs a requirement to observe in detail a blood at a certain one point on the area (ROI) or on a certain one scan line, then the transmit-receive unit 201 repeats a lot of number of times of transmit and receive of the ultrasonic waves in a direction along a one scan line passing through the one point, or a direction along the one scan line of interest. And data, which is generated in the the Doppler signal processing unit 206 in accordance with the signals thus obtained by the repetitive transmit and receive of the ultrasonic waves, is fed to the pulse/continuous wave Doppler analyzing unit 401 constituting the Doppler processing unit 400. When it is interested in the a blood flow at a certain point, a pulse-like shaped ultrasonic beam is transmitted into the subject. On the other hand, when it is desired to obtain blood information excellent in S/N ratio, permitting that blood information on a certain one scan line is averaged, a ultrasonic beam is transmitted in the form of a continuous wave into the subject.

The pulse/continuous wave Doppler analyzing unit 401 performs an FFT (Fast Fourier Transform) operation based on data obtained through carrying out a lot of number of times of transmit and receive of the ultrasonic waves on a certain one point, or a certain one scan line to obtain blood flow information on the one point, or blood flow information averaged on the one scan line. Data representative of the blood flow information obtained in the pulse/continuous wave Doppler analyzing unit 401 is fed via the echo bus 902 to the scroll scan converter 303. The scroll scan converter 303 generates a video signal representative of an image in which the longitudinal axis and the lateral axis denote a blood flow velocity and a time axis, respectively, and the image may scroll in a direction of the time axis. This video signal is fed via the video bus 903 to the display control unit 500. The display control unit 500 causes the video signal to be displayed on the observation television monitor 707 together with the B-mode image transmitted from the black-and-white scan converter 301, for example.

According to the ultrasonic diagnostic apparatus, weak ultrasonic waves, which are reflected within the subject and returns to the ultrasonic transducers 21, are received to obtain weak signals, and the weak signals are amplified with great degree. Consequently, a thermal noise is large. In addition, since the ultrasonic waves returned to the ultrasonic transducers 21 include mixedly ultrasonic components multi-reflected complicatedly within the subject, those ultrasonic components also strongly effect in the form of the noise. Hence, in a case where no any measure is taken, those noises cause an tomographic image to include very large noises, wherein a pixel value of each pixel extremely varies on each frame.

For this reason, at the pre-stage side of the black-and-white scan converter 301, which constitutes the digital scan converter unit 300, there is provided an image processing circuit for basically performing an averaging processing over a plurality of frames for each pixel. The image data, which is outputted from the analog signal processing circuit 205, is fed through the echo bus 902 to the image processing circuit to perform the averaging processing. The image data (averaged image data) obtained through the averaging processing is fed to the black-and-white scan converter 301.

Performing the averaging processing over a plurality of frames makes it possible to reduce the thermal noises, since the thermal noises are essentially random noises. On the other hand, noises caused by the multi-reflection are not reduced by a interframe averaging, when it is supposed that the ultrasonic probe, which are put in the subject or to the body surface of the subject, stands still completely. Indeed, however, the inside of the subject (human body) always moves. Further, the ultrasonic probe, which is put to the body surface of the subject, is also moved slightly, although it is fixedly held by an operator's hand. These slight movements cause the noises due to the multi-reflection and the like to vary for each frame. Thus, the interframe averaging makes it possible to reduce the noises due to the multi-reflection and the like too.

FIG. 8 is a block diagram of an image processing circuit for performing an averaging processing over a plurality frames, according to the earlier development.

The image processing circuit comprises an average arithmetic operating unit 41 for performing an averaging processing, a storage unit 42 for storing image data, a data input terminal 43 for inputting image data, a factor input terminal 44 for inputting a factor selection signal (which will be described latter), and a data output terminal 45 for outputting image data (averaged image data) after the averaging processing. The average arithmetic operating unit 41 comprises a factor selector 411, two multipliers 412 and 413, and an adder 414.

The multiplier 412 sequentially receives image data A(K, I) from the analog signal processing unit 205 via the echo bus 902 and the data input terminal 43. Where K stands for a frame number of an image, and I stands for a pixel number of a piece of image. That is, the image data A(K, I) denotes an image data of Ith pixel of an image of a frame number K. Such image data are sequentially inputted one by one in a pixel corresponding in a direction such that the pixel number I is incremented. When a piece of image (a frame) of image data is terminated in its entry, the successive frame of image of image data is inputted in a similar fashion to that of the previous frame of image data.

The factor selector 411 receives from the control unit 100 shown in FIG. 7 via the CPU bus 901 and the factor input terminal 44 the factor selection signal to select a weighting factor to be used when the weighting average arithmetic operation is performed. The factor selector 411 transmits weight P ($0 \leq p \leq 1$) and weight 1−P, which are selected in accordance with the inputted factor selection signal, to the multipliers 413 and 412, respectively.

The storage unit 42 stores therein already averaging image data B (K−1, I), which is a resultant of the weighting average arithmetic operation being performed with respect to the immediately previous frame K−1. The averaging image data B (K−1, I) as to the immediately previous frame K−1 is read out from the storage unit 42 and is fed to the multiplier 413.

Of the two multipliers 412 and 413, in the multiplier 412, the image data A(K, I) of the new frame K transmitted from the analog signal processing unit 205 is multiplied by the weight 1−P transmitted from the factor selector 411, and then the multiplication result (1−P)·A(K, I) is transferred to the adder 414. On the other hand, in the multiplier 413, the averaging image data B (K−1, I) as to the immediately previous frame K−1 read out from the storage unit 42 is multiplied by the weight P transmitted from the factor selector 411, and then the multiplication result P·B (K−1, I) is transferred to the adder 414. The adder 414 adds the multiplication result (1−P)−A(K, I) and the multiplication result P·B (K−1, I) to each other to generate the averaging image data $$B (K, I)=(1-P)\cdot A(K, I)+P\cdot B (K-1, I) \tag{1}$$

The averaging image data B (K, I) thus generated is transferred to the black-and-white scan converter 301. Thus, finally, the image based on the averaging image data B (K, I) is displayed on the observation television monitor 707.

Further, the averaging image data B (K, I) is transferred to the storage unit 42 and stored in the storage unit 42 for use in the weighting average arithmetic operation for the subsequent frame K+1.

Here, equation (1) stands for an infinite impulse response which implies a filtering processing by the IIR filter in which an image once entered involves sequentially at the rate of (I–P), P(I–P), $P^2$(I–P), . . . , as the frame advances.

In the event that images do not move, when the weighting factor approaches 1, noises or the like, which exhibit sharp fluctuation on each frame, are suppressed, and thus it is possible to obtain a clear image. However, in the event that there is a movement within the subject, the after-image strongly appears at the associated portion. And as a result, the tracking ability of images to the movement is extremely deteriorated whereby image quality is rather damaged. Reversely, when the weighting factor approaches 0, it is hard that the after-image appears. And as a result, the tracking ability of images to the movement is enhanced. In this case, however, an effect of noise reduction, which is the essential purpose of the weighting average arithmetic operation, will be damaged.

In order to improve this problem, there has been proposed such a scheme that the weighting factor P is adaptively varied for each pixel, but not fixed into a certain value. However, such a scheme is associated with a limit to sufficiently satisfy both the requirements mutually to the contrary such as the reduction of noises and the tracking ability of images to the movement.

Japanese Patent No. 2523594 discloses an image processing scheme that with respect to individual pixels, in the event that the subsequent frame is decreased in luminance as compared with the previous frame, the averaging processing shown in equation (1) is practiced on the pixel, alternatively in the event that the subsequent frame is increased in luminance as compared with the previous frame, the averaging processing is not practiced on the pixel, and the pixel value of the subsequent frame is outputted as it is. That is, this scheme is to switchingly select for every pixel as to whether the averaging processing is performed in accordance with a direction of variation of the pixel values. However, in this case, it is difficult to suppress the after-image associated with the portion concerned with the movement within the subject, and thus it is insufficient with respect to the effect of the reduction of noises.

SUMMARY OF THE INVENTION

In view of the foregoing, it is therefore an object of the present invention to provide an ultrasonic diagnostic apparatus capable of contributing to a reduction of noises and also obtaining an excellent image in a tracking ability to the movement.

To achieve the above-mentioned objects, according to the present invention, there is provided the ultrasonic diagnostic apparatus in which transmission of ultrasonic waves into the subject and reception of the ultrasonic waves reflected within the subject are repeatedly performed to obtain a plurality of sequentially continued frames of image data, and a dynamic image is displayed in accordance with the image data thus obtained, said ultrasonic diagnostic apparatus comprising:

a first filter for performing an averaging arithmetic operation between an immediately previous frame of image data and a new frame of image data independently for each of image segments obtained when said dynamic image is divided into a plurality of image segments each consisting of one or more pixels; and a second filter for performing an averaging arithmetic operation between an averaging image data, which has been generated through the averaging arithmetic operation already performed using the immediately previous frame of image data, and a new frame of image data, wherein an averaging arithmetic operation processing by said first filter and an averaging arithmetic operation processing by said second filter are switchingly selected for each of said image segments in accordance with a variation in a value of image data on each of said image segments, over the plurality of frames.

In the averaging arithmetic operation processing according to the earlier development, as shown in FIG. 8, since the image data to be outputted and the image data to be stored for use in the average arithmetic operation for the subsequent frame are identical, there is a limit in satisfaction for both the reduction of noises and the tracking ability to the movement, even if the weighting factor is adaptively altered, for example, for each pixel, alternatively, it is switchingly selected as to whether or not the averaging processing is performed in the direction of a variation of luminance. On the other hand, according to the present invention, an averaging arithmetic operation processing by the first filter for performing for each image segment an averaging arithmetic operation between the image data of only two frames of the immediately previous frame and a new frame, that is, by an FIR filter constructed with a minimum-sized structure, and an averaging arithmetic operation processing by said second filter for performing an IIR type of filtering processing similar to the earlier technology, are switchingly selected for each of the image segments in accordance with a variation in a value of image data on each of the image segments, over the plurality of frames. The use of the minimum-sized FIR filter on a portion involved in a movement inside of the subject makes it possible to enhance the tracking ability of the image to the movement of the subject. On the other hand, as to a portion of the subject involved in a little movement, the use of the IIR filter makes it possible to reduce noises.

Specifically, the ultrasonic diagnostic apparatus according to the present invention comprises (1) an image processing unit, and (2) an image display unit.

The image processing unit (1) comprises:

(1_1) a storage unit for storing a frame of image data;

(1_2) an average arithmetic operation unit for receiving the image data read from said storage unit and a new frame of image data to perform an average arithmetic operation thereby generating an averaging image data;

(1_3) a data selection unit for receiving the averaging image data generated in said average arithmetic operation unit and a new frame of image data to select either one of both the image data received in accordance with a predetermined data selection signal for each of image segments obtained when said dynamic image is divided into a plurality of image segments each consisting of one or more pixels, and to transmit the image data thus selected to said storage unit; and (1_4) a selection control unit for receiving at least one of the image data read from said storage unit and a new frame of image data to generate the data selection signal in accordance with a predetermined first criterion and transmit the data selection signal to said data selection unit.

It is noted that the above expression "each of image segments obtained when said dynamic image is divided into a plurality of image segments each consisting of one or more pixels" typically implies "each pixel", but it is not necessarily restricted to "each pixel", and it is acceptable to be replaced by 'every a plurality of pixels'.

The image display unit noted in the above item (2) displays an image based on the averaging image data generated in said average arithmetic operation unit noted in the above item (1_2).

According to the ultrasonic diagnostic apparatus having the image processing unit (1) comprising the above-noted subjects (1_1) to (1_4), the first filter and the second filter may share the storage unit (1_1) and the average arithmetic operation unit (1_2) with each other. Thus, it is possible to attain the above-mentioned object of the present invention with a small-scaled circuit.

In the ultrasonic diagnostic apparatus as mentioned above, it is acceptable that said selection control unit (1_4) receives both the image data read from said storage unit (1_1) and the new frame of image data, and said selection control unit generates the data selection signal to instruct to select for each of the image segments the averaging image data or the new frame of image data of both the image data received by said data selection unit according as each difference data, which is obtained by means of subtracting the image data associated with the image segment of the image data read from said storage unit and received by said selection control unit, from the image data associated with the image segment of the new frame of image data received by said control selection unit, is less than a first threshold or not, and transfers the data selection signal thus generated to said data selection unit.

In the ultrasonic diagnostic apparatus as mentioned above, alternatively, it is acceptable that said selection control unit (1_4) receives both the image data read from said storage unit (1_1) and the new frame of image data, and said selection control unit generates the data selection signal to instruct to select for each of the image segments the averaging image data or the new frame of image data of both the image data received by said data selection unit according as each difference data, which is obtained by means of subtracting the image data associated with the image segment of the new frame of image data received by said selection control unit, from the image data associated with the image segment of the image data read from said storage unit and received by said control selection unit, is less than a second threshold or not, and transfers the data selection signal thus generated to said data selection unit.

In the ultrasonic diagnostic apparatus as mentioned above, further alternatively, it is acceptable that said selection control unit (1_4) receives at least the image data read from said storage unit (1_1), of the image data read from said storage unit and the new frame of image data, and said selection control unit generates the data selection signal to instruct to select for each of the image segments the averaging image data or the new frame of image data of the image data received by said data selection unit according as the image data associated with the image segment of the image data read from said storage unit and received by said control selection unit, is less than a third threshold or not, and transfers the data selection signal thus generated to said data selection unit.

In the ultrasonic diagnostic apparatus as mentioned above, still further alternatively, it is acceptable that said selection control unit (1_4) receives at least the new frame of image data, of the image data read from said storage unit (1_1) and the new frame of image data, and said selection control unit generates the data selection signal to instruct to select for each of the image segments the averaging image data or the new frame of image data of the image data received by said data selection unit according as the image data associated with the image segment of the new frame of image data received by said control selection unit, is less than a fourth threshold or not, and transfers the data selection signal thus generated to said data selection unit. In the ultrasonic diagnostic apparatus as mentioned above, it is preferable that said average arithmetic operation unit performs a weighting average arithmetic operation for associated pixel-to-pixel of said both image data received into said average arithmetic operation unit.

In the ultrasonic diagnostic apparatus as mentioned above, it is acceptable that said selection control unit (1_4) generates the data selection signal, and in addition generates a factor selection signal to select a weighting factor in the weighting average arithmetic operation for each of the image segments in accordance with a predetermined second criterion, and said average arithmetic operation unit performs the weighting average arithmetic operation, while selecting a weighting factor for each of the image segments in accordance with the factor selection signal transmitted from said selection control unit.

In the ultrasonic diagnostic apparatus as mentioned above, it is preferable that said selection control unit (1_4) receives both the image data read from said storage unit and the new frame of image data, and said selection control unit generates the factor selection signal to select for each of the image segments a smaller weight as a weight for the image data read from said storage unit and a larger weight for the new frame of image data as a difference between the image data associated with the image segment of the new frame of image data received by said selection control unit and the image data associated with the image segment of the image data read from said storage unit and received by said selection control unit is larger in value, and transfers the factor selection signal thus generated to said average arithmetic operation unit.

In the ultrasonic diagnostic apparatus as mentioned above, it is further preferable that said selection control unit (1_4) generates the factor selection signal to select a weighting factor for each of the image segments to alter more promptly a weight of the image data read from said storage unit to a small weight and alter more promptly a weight of the image data of the new frame of image data to a large weight, as an absolute value of a difference, the which difference is obtained by means of subtracting the image data associated with the image segment of the image data read from said storage unit and received by said selection control unit, from the image data associated with the image segment of the new frame of image data received by said selection control unit, is larger as compared with a case where the difference is positive, in a case where the difference is negative, even if the absolute value of the difference is identical, and transfers the factor selection signal thus generated to said average arithmetic operation unit.

In the ultrasonic diagnostic apparatus as mentioned above, it is also preferable that said selection control unit (1_4) receives at least the image data read from said storage unit, of the image data read from said storage unit and the new frame of image data, and said selection control unit generates the factor selection signal to select a smaller weight as a weight of the image data read from said storage unit for each of the image segments and select a larger weight as a weight of the new frame of image data with larger value of the image data associated with the image segment of the image data read from said storage unit and received by said selection control unit, and transfers the factor selection signal thus generated to said average arithmetic operation unit.

According to the present invention, as mentioned above, the image data used in the average arithmetic operation for the subsequent frame is selected for each of the image segment from between the image data before the average arithmetic operation processing and the averaging image data after the average arithmetic operation processing. In addition to this feature, a control of the weighting factor makes it possible to obtain a more high quality of image through a variation in degree of averaging.

Further, according to the present invention, there is provided a filter comprising: a storage unit for storing data; an average arithmetic operation unit for receiving the data read from said storage unit and new data to perform an average arithmetic operation; a data selection unit for receiving data generated in said average arithmetic operation unit and new data to select either one of both the data received in accordance with a predetermined data selection signal and transmit the data thus selected to said storage unit; a selection control unit for generating the data selection signal in accordance with either one of the data read from said storage unit and the new data and transmit the data selection signal to said data selection unit.

According the filter of the present invention, in the event that both the filters, that is, the minimum structure of FIR filter for performing an averaging arithmetic operation for the previous frame of data and the present frame of data, for example, the above-mentioned first filter, and a so-called IIR filter for performing an averaging arithmetic operation for the data generated by the averaging arithmetic operation as to the previous frame and the present frame of data, for example, the above-mentioned second filter, are needed, such both the filters may share the averaging arithmetic operation unit and the storage unit with each other.

BRIEF DESCRIPTION OF THE DRAWINGS

FIG. 6 is a view showing an alternative result of a simulation when a cyst passes through a pixel point shown in FIG. 4;

DESCRIPTION OF THE PREFERRED EMBODIMENTS

Hereinafter, there will be described embodiments of the present invention.

Figure 1:
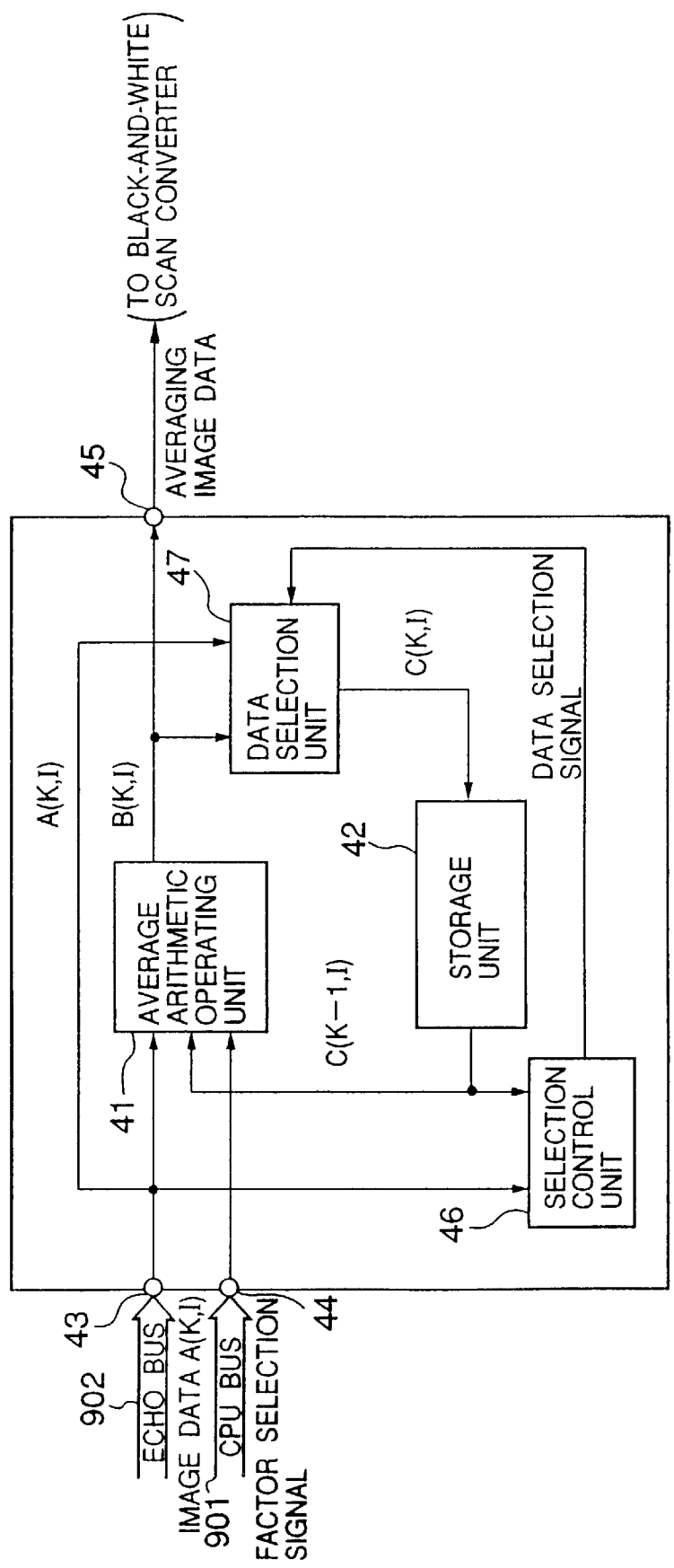
FIG. 1 is a block diagram of an image processing unit of an ultrasonic diagnostic apparatus according to an embodiment of the present invention.

FIG. 1 is a block diagram of an image processing circuit, as an embodiment of an image processing unit of an ultrasonic diagnostic apparatus according to the present invention. The ultrasonic diagnostic apparatus has been already explained in its entirety referring to FIG. 7. Therefore, with respect to the whole structure of the ultrasonic diagnostic apparatus, the redundant description will be omitted, and if necessary, FIG. 7 will be referred to. The image processing circuit according to the present embodiment is placed at the pre-stage end of the black-and-white scan converter 301, instead of the image processing circuit according to the earlier development shown in FIG. 8. It is to be noted that the image processing circuit shown in FIG. 1 corresponds to also an embodiment of a filter according to the present invention. In FIG. 1 and the following FIG. 2, the same parts are denoted by the same reference numbers as those of FIG. 8. And the redundant description will be omitted.

In the image processing circuit shown in FIG. 1, an average arithmetic operating unit 41 has the same structure as the average arithmetic operating unit 41. In the average arithmetic operating unit 41, a new frame K of image data A(K, I) and image data C (K−1, I) read from the storage unit 42 are subjected to a weighting addition to generate an averaging image data B (K, I) expressed by $$B\ (K,\ I) = (1-P) \cdot A\ (K,\ I) + P \cdot C\ (K-1,\ I) \qquad (2)$$

Figure 7:
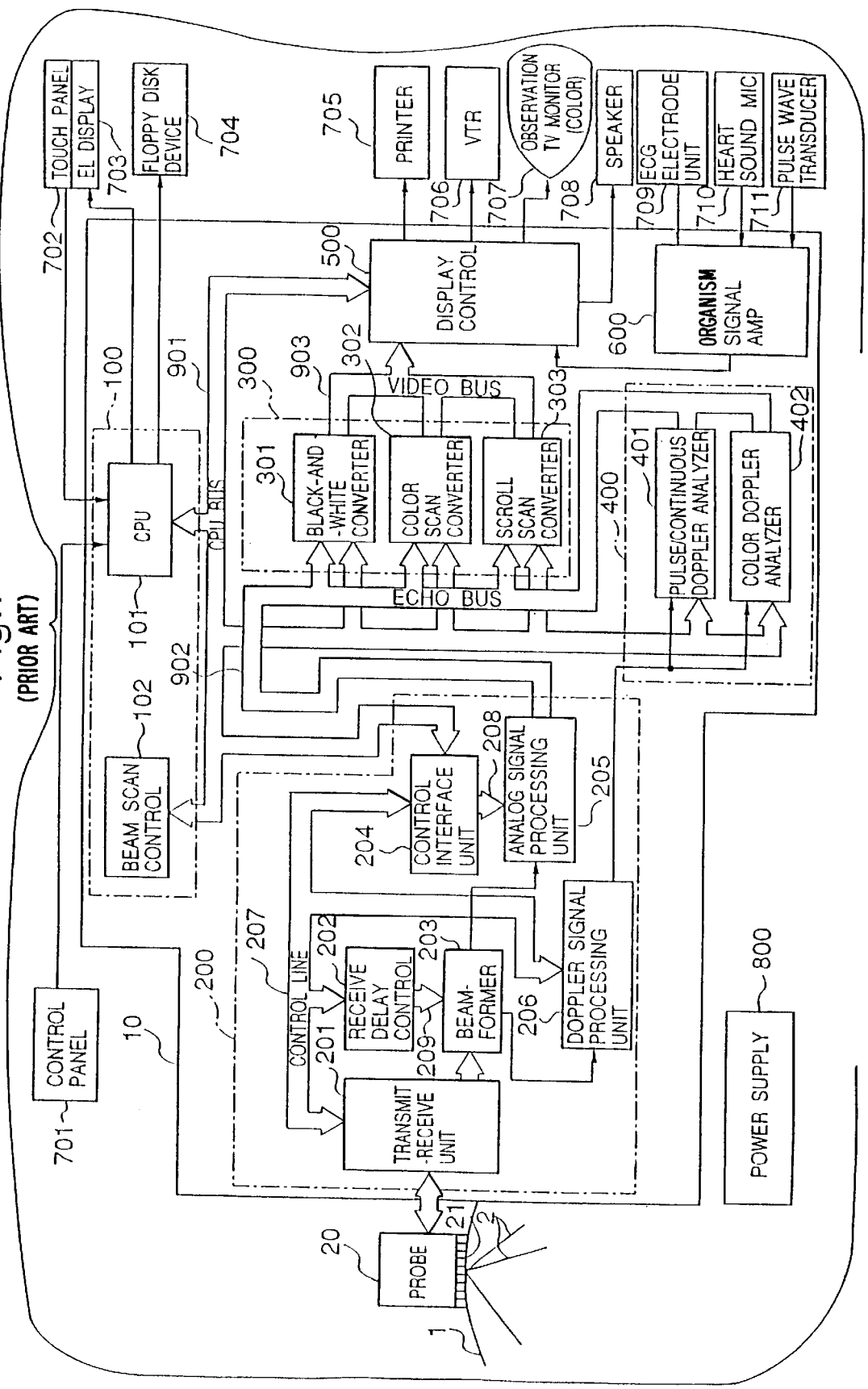
FIG. 7 is a block diagram showing the basic arrangement of constituents of an ultrasonic diagnostic apparatus by way of example.

The averaging image data B (K, I) thus generated in the average arithmetic operating unit 41 is transferred via the black-and-white scan converter 301 shown in FIG. 7 to the display control unit 500 to be used for an image display.

Figure 8:
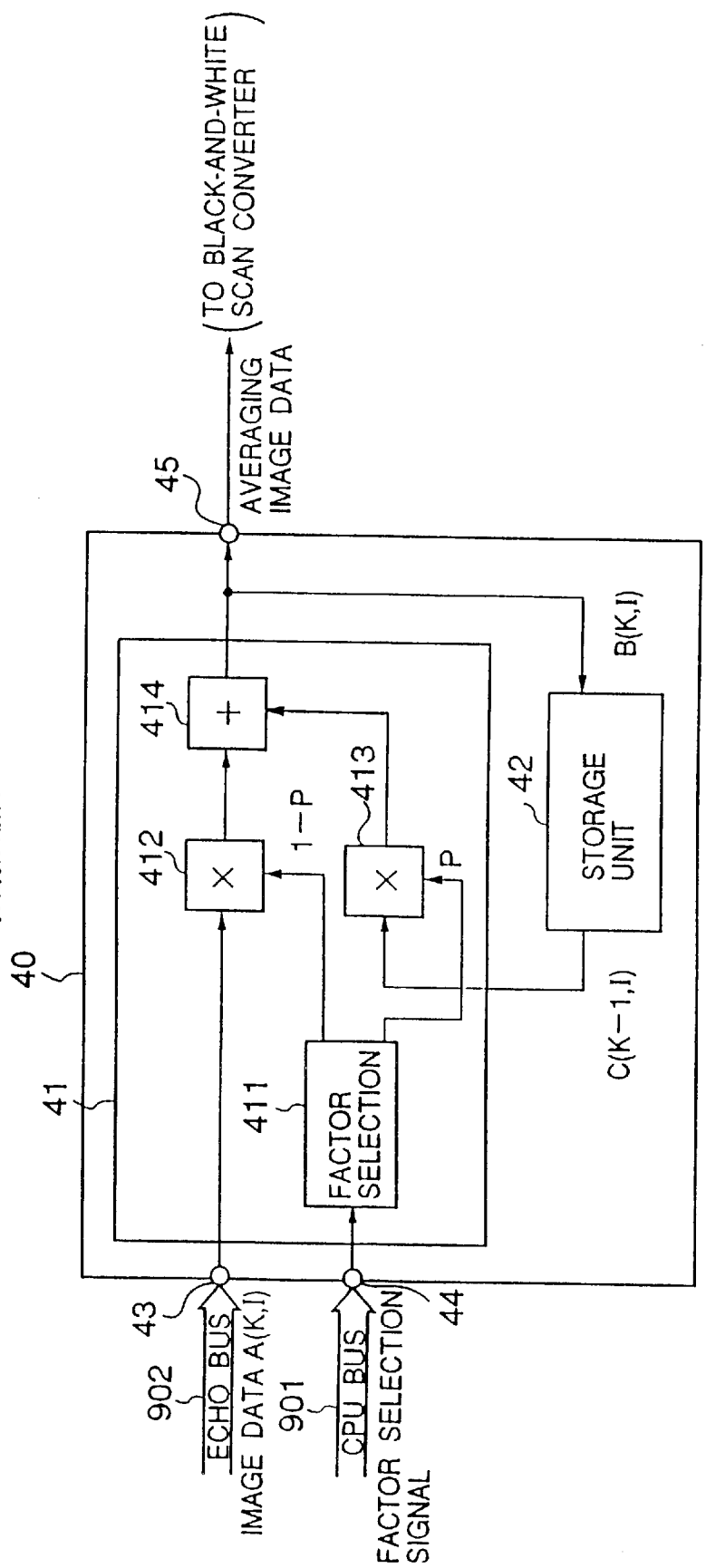
FIG. 8 is a block diagram of an image processing circuit for performing an averaging processing over a plurality frames, according to the earlier development.

The image processing circuit shown in FIG. 1 comprises not only the average arithmetic operating unit 41, the storage unit 42, the data input terminal 43, the factor input terminal 44, and the data output terminal 45 shown in FIG. 8, but also a selection control unit 46 and a data selection unit 47. The selection control unit 46 comprises, for example, a subtracter for detecting a difference between two image data, and a comparator for comparing the difference with a predetermined threshold. The data selection unit 47 comprises a selector for selecting and outputting either one of the two image data inputted for each pixel. The selection control unit 46 receives a new frame K of image data A (K, I) and an immediately previous frame K−1 of image data C (K−1, I) read from the storage unit 42 to generate the data selection signal on each pixel I on the basis of these two types of image data of A (K, I) and C (K−1, I). The data selection signal thus generated is fed to the data selection unit 47. The data selection unit 47 receives not only the data selection signal, but also both the new frame K of image data A (K, I) and the image data (averaging image data) B (K, I) after average arithmetic operation obtained through the average arithmetic operating unit 41, and selects either one of the two types of image data of A (K, I) and B (K, I) on the basis of the data selection signal, for each pixel I, and transmits the selected image data to the storage unit 42. The image data, which is obtained by selecting either one of the two types of image data of A (K, I) and B (K, I) on the basis of the data selection signal, for each pixel I, by the data selection unit 47, is referred to as image data C (K, I). The above-noted image data C (K−1, I) is image data generated by selecting either one of two types of image data of A (K−1, I) and B (K−1, I), with respect to the immediately previous frame, for each pixel, in a similar fashion to the above, and stored in the storage unit 42.

As criteria of determining, for each pixel, as to whether the selection control unit 46 generates the data selection signal to select the image data A (K, I), or the data selection signal to select the image data B (K, I), the following criteria are used.

When any one or more of the conditions (a) to (d) set forth below is satisfied, the averaging image data B (K, I) is selected, and when none of the conditions (a) to (d) is satisfied, a new frame of image data A (K, I) is selected.

(a) A (K, I)−C (K−1, I)<Th 1
(b) C (K−1, I)−A (K, I)<Th 2
(c) A (K, I)<Th 3
(d) C (K−1, I)<Th 4 where Th 1 to Th 4 each denote a threshold.

As shown in the cases (a) and (b), when a difference between A (K, I) and C (K−1, I) is small, it implies that the movement is little. Consequently, the selection of the averaging image data (image data after the average arithmetic operation processing) B (K, I) as image data for the average arithmetic operation processing for the subsequent frame makes it possible to contribute to the substantial reduction of noises. On the other hand, when a difference between A (K, I) and C (K−1, I) is large, it implies that the movement is large. Consequently, the selection of a new frame of image data (image data before the average arithmetic operation processing) A (K, I) as image data for the average arithmetic operation processing for the subsequent frame makes it possible to shut out an influence of the past frame, reduce the after-image, and enhance the tracking ability to the movement.

Thermal noises on the ultrasonic probe 20, transmit-receive unit 201, etc. and noises due to multi-reflection of ultrasonic waves inside of the subject are generally low in luminance level. Accordingly, as shown in the cases (c) and (d), when the image data A (K, I) itself or the image data C (K−1, I) itself, but not the difference, takes a small value, or is low in luminance level, the selection of the averaging image data after the average arithmetic operation processing as image data for the average arithmetic operation processing for the subsequent frame makes it possible to contribute to the reduction of the noises. On the other hand, when the image data A (K, I) or the image data C (K−1, I) takes a large value, or is high in luminance level, the selection of a new frame of image data A (K, I) before the average arithmetic operation processing as image data for the average arithmetic operation processing for the subsequent frame makes it possible to contribute to the enhancement of the tracking ability to the movement.

The reason why the thresholds Th1 and Th2 are different from each other between the cases (a) and (b) is that in some cases, it happens that it is better to vary a balance of the reduction of noises and the tracking ability to the movement between a case where the dark pixel (low in luminance level) rises in its luminance and a case where the light pixel (high in luminance level) goes down in its luminance. When the luminance rapidly rises, rising of the luminance on the display image screen involves no serious problem. However, a delay of the luminance on the display image screen in a lowering speed in spite of the rapid down of the luminance causes after-images to stand out. Consequently, the thresholds Th1 and Th2 are set up to typically satisfy Th1>Th2.

While the present embodiment uses all of the above-mentioned four criteria (a)–(d), there is no need to adopt all of these criteria. It is acceptable to use anyone of these criteria, alternatively a combination of there criteria.

According to the present embodiment, while the selection control unit 46 generates the data selection signal for each pixel I, and the data selection unit 47 selects the image data A (K, I) or B (K, I) for each pixel I, there is no need to perform these operations for each pixel. It is acceptable that these operations are performed for each image segment, when an image is divided into a plurality of segments, for example, every two pixels or every three pixels. For example, in the event that the operations are performed every two pixels, the selection control unit 46 generates data selection signals for two pixels I and I+1 on the basis of the mean value of the image data A (K, I) and A (K, I+1) or the image data A (K, I) selected as the representation of these image data A (K, I) and A (K, I+1), and the mean value of the image data C (K−1, I) and C (K−1, I+1) or the image data C (K−1, I) selected as the representation of these image data C (K−1, 1) and C (K−1, I+1). And the data selection unit 47 selects the image data A (K, I) and A (K, I+1), or B (K, I) and B (K, I+1) for both pixel I and pixel I+1, on the basis of the data selection signals generated in the selection control unit 46.

Figure 2:
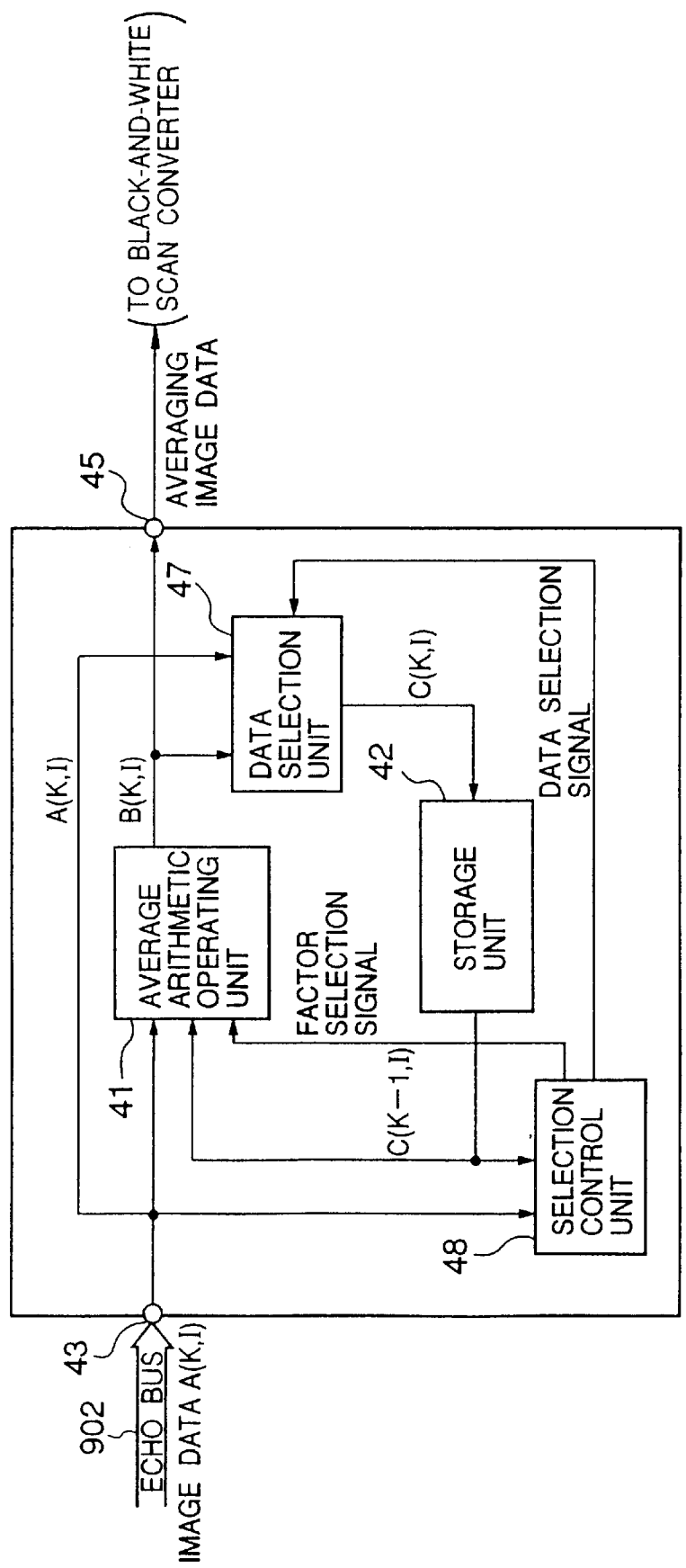
FIG. 2 is a block diagram of an image processing unit of an ultrasonic diagnostic apparatus according to an alternative embodiment of the present invention.

FIG. 2 is a block diagram of an image processing circuit, as an alternative embodiment of an image processing unit of an ultrasonic diagnostic apparatus according to the present invention. There will be described different points from the embodiment shown in FIG. 1.

The image processing circuit shown in FIG. 2 comprises a selection control unit 48, instead of the selection control unit 46 for generating the data selection signal, for generating not only the data selection signal, but also a factor selection signal.

The factor selection signal generated in the selection control unit 48 is fed to the average arithmetic operating unit 41. The average arithmetic operating unit 41 selects a weighting factor P in the average arithmetic processing based on equation (2) in the average arithmetic operating unit 41 in accordance with the factor selection signal generated in the selection control unit 48, and performs the average arithmetic operating processing of equation (2) using the selected weighting factor P. As criteria of generating the factor selection signal to select the weighting factor P in the selection control unit 48, the present embodiment adopts the following criteria.

(a) With respect to pixel I, a smaller value of weighting factor, as the weighting factor P, is selected with a larger value of the absolute value of difference, |A (K, I)−C (K−1, I)|.

The reason why this is to do so is that as described above, when the luminance is changed extremely among frame-to-frame, there is a possibility that the subject moves, and thus the weighting factor P is lowered to be a smaller value so that an influence of the past frame is reduced, and a new frame is used with greater significance, thereby enhancing the tracking ability to the movement.

(b) Even in case (a), the difference "A(K, I)−C(K−1, I)" is determined as to whether it is positive or negative. And the weighting factor P is altered more quickly to be a smaller value with a larger value of the absolute value of difference, |A (K, I)−C (K−1, I)| in case of being negative as compared with the case of being positive.

What is meant by that the difference "A(K, I)−C(K−1, I)" is negative implies that the previous frame is involved in high luminance, and the present frame is involved in lower luminance, then it is preferable that the after-image is promptly erased. Consequently, when the difference is negative, the smaller value of weighting factor is used as compared with the case of being positive, so that the influence of the past frame is reduced.

(c) A smaller value of weighting factor, as the weighting factor P, is used with larger value (higher luminance level) of C(K−1, I).

Noises are relatively low in the luminance level. When the luminance level is low, a larger value of weighting factor, as the weighting factor P, is used, so that noises are reduced through strong averaging.

The selection control unit 48 in the embodiment shown in FIG. 2 comprises, for the purpose of performing operations of the above-mentioned criteria (a)–(c), a subtracter for determining, for example, the difference "A(K, I)–C(K–1, I)", an absolute value circuit for determining the absolute value of the difference, and a factor table indicating of an absolute value of the difference, a sign of the difference, and a corresponding relation between the value of the image data and the weighting factor. The factor table is referred to taking the absolute value of the difference, the sign of the difference, and the image data C(K–1, I) in the form of the argument to determine the weighting factor P.

Figure 3:
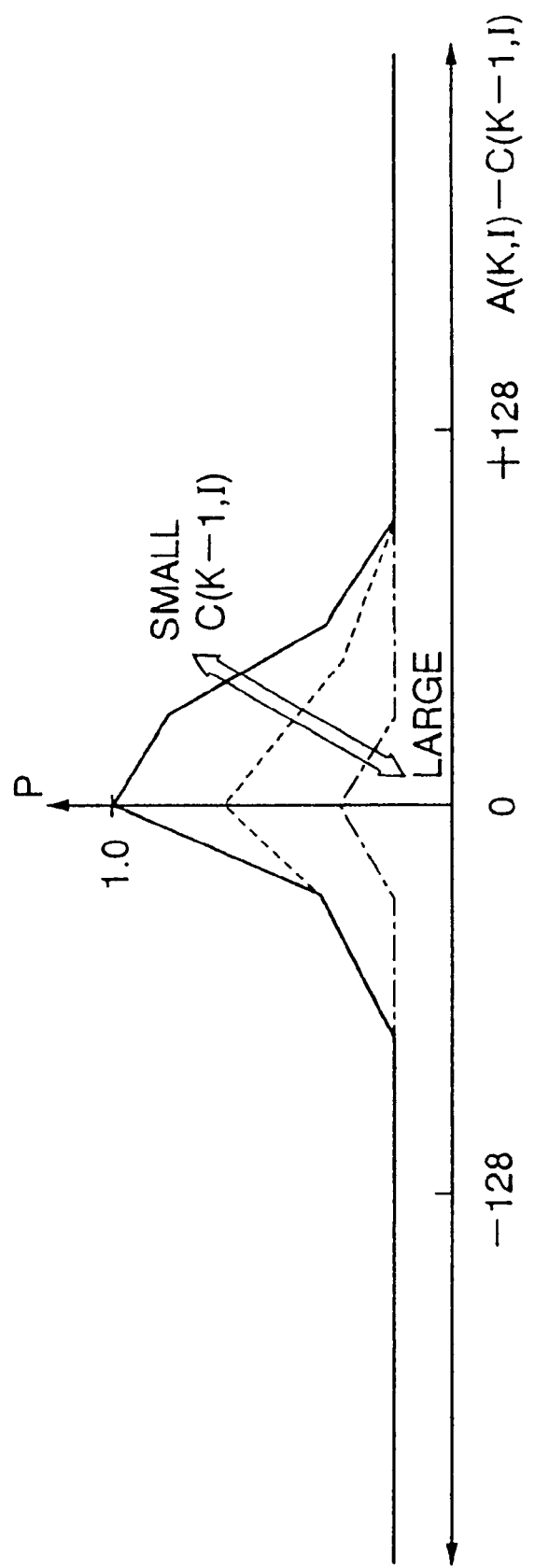
FIG. 3 is a graphical representation showing a variation of a weighting factor P.

FIG. 3 is a graphical representation showing a variation of a weighting factor P in a case where the above-mentioned criteria (a)–(c) are used on a complex basis.

The weighting factor P is altered to a smaller value with a larger value of the absolute value of difference, $|A(K, I)-C(K-1, I)|$. In addition, the weighting factor P is altered more promptly to a smaller value as $|A(K, I)-C(K-1, I)|$ becomes larger, in case of A(K, I)–C(K–1, I)<0, rather than A(K, I)–C(K–1, I)>0. Further, the smaller value is selected as the weighting factor P with larger C(K–1, I) or higher luminance.

When the weighting factor is selected in accordance with the above-mentioned manner, for example, the inside of the subject (an image portion of low luminance level) is subjected to the strong averaging, while the tissue portion of high luminance level is subjected to an image processing such that a degree of averaging is weakened. Further, in FIG. 3, in the event that the symmetrical weighting factor P is used, in other words, in the event that regardless of the sign of A(K, I)–C(K–1, I) being positive or negative, when the absolute value of A(K, I)–C(K–1, I) is identical, the same value of weighting factor is used, when it is considered that, for example, in a case where a certain pixel is, first, in a high luminance level as in a flesh, as a result of occurring of the movement inside of the subject, or the movement of the ultrasonic probe, the pixel is changed in the luminance level to a low level as inside of a blood vessel or a viscera, in connection with the subsequent frame, the pixel is first involved in the high luminance, and the luminance difference is large as compared with the subsequent frame, and thus the small value of the weighting factor P is selected, and the luminance of the pixel is rapidly lowered. However, when once the luminance of the pixel is lowered, the luminance difference becomes small as compared with the further subsequent frame, and then the weighting factor is rapidly increased. For this reason, the luminance of the pixel is hard to converge into the essential luminance level and then involves an image as if slightly enveloped in mist extending over several frames. In view of this, in the event that the luminance difference is negative (A(K, I)–C(K–1, I)<0), in other words, in the event that the luminance varies in a direction such that it is lowed, a smaller value of weighting factor P is selected as compared with the luminance difference being positive. This selection makes it possible to prevent the influence caused by the movement inside of the subject and the movement of the ultrasonic probe.

In this manner, when the image data A(K,I) and B(K,I) are selected for each pixel by the data selection unit 44, and further, as the weighting factor P, various values of weighting factors are selected, as in the graphical representation shown in FIG. 3, to perform the average arithmetic operation, it is possible to implement both the reduction of noises and the tracking ability to the movement with greater satisfaction.

Next, there will be described a simulation result as to the reduction of noises and the tracking ability, in connection with the use of the image processing circuit shown in FIG. 1.

Figure 4:
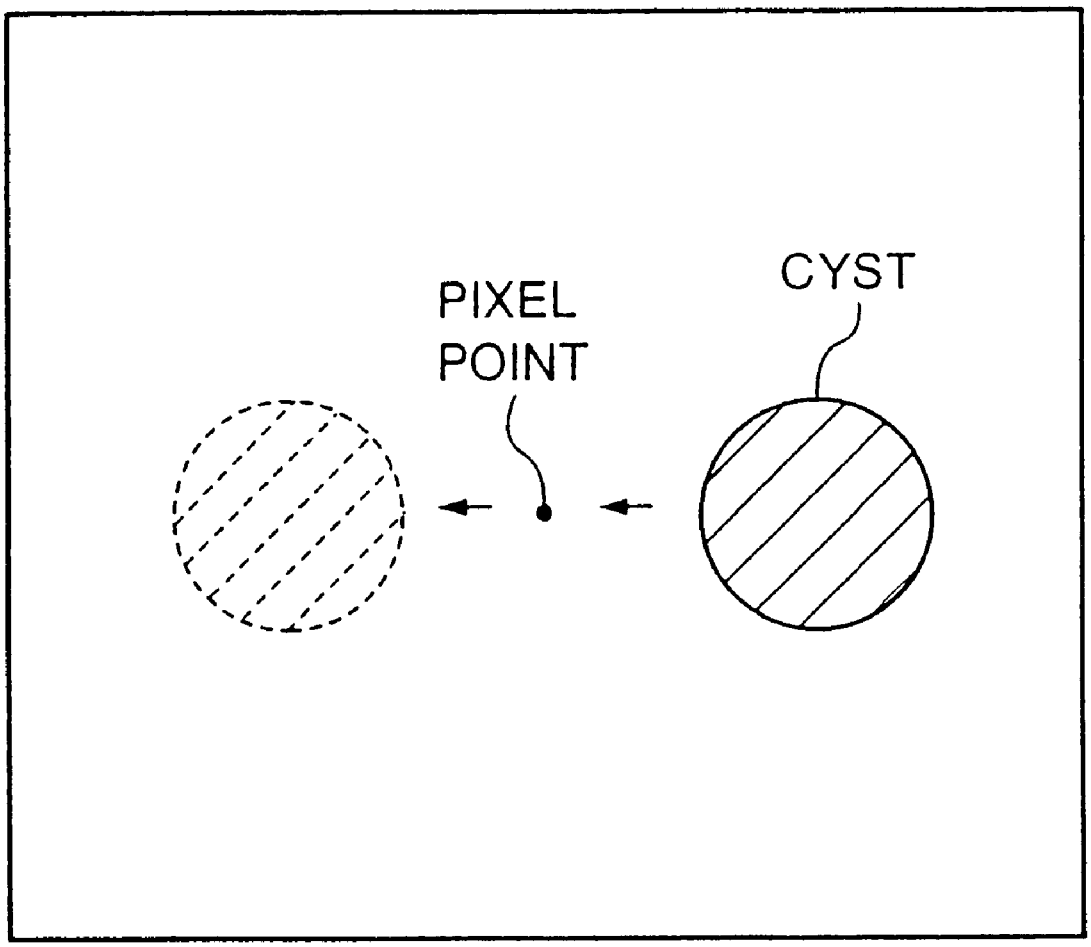
FIG. 4 is a schematic diagram showing a condition of a simulation.

FIG. 4 is a schematic diagram showing a condition of the simulation.

Here, it is assumed that a cyst passes through a certain pixel point. The cyst implies a portion in which ultrasonic waves do not almost reflect inside thereof, for example, a viscera, a lesion site, etc. in which water or pus has formed.

Figure 5:
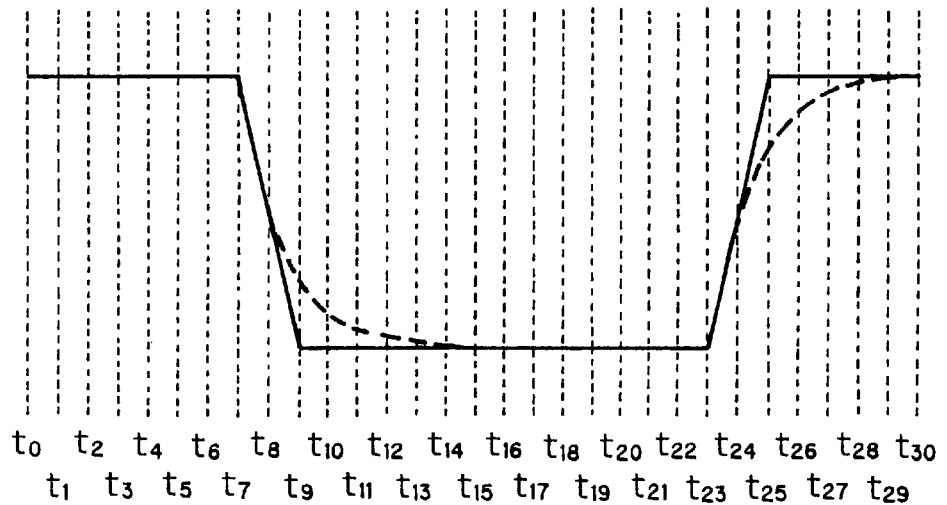
FIG. 5 is a view showing a result of a simulation when a cyst passes through a pixel point shown in FIG. 4.

FIG. 5 is a view showing a result of a simulation when a cyst passes through a pixel point shown in FIG. 4. Part (A) of FIG. 5 shows a variation of pixel values before the averaging processing, and part (B) of FIG. 5 shows a variation (a solid line) of pixel values after passing through the image processing unit shown in FIG. 1, of the pixel point, and a variation (a broken line) of pixel values after passing through the image processing unit shown in FIG. 8. Where the axis of abscissas denotes times $t_0, t_1, \ldots$.

Part (A) of FIG. 5 shows a variation of pixel values assuming that none of any noises such as thermal noises exist. Indeed, however, a very large noise is superposed. In order to reduce such a noise, while the averaging processing is performed, it is preferable that the variation of pixel values after the averaging processing is close on the variation of pixel values assuming that none of any noises exist, as much as possible.

Part (B) of FIG. 5 shows the variations (a solid line and a broken line) of pixel values in which both the solid line and the broken line are associated with the adding mean where weighting factor P=0.5, that is, two image data are simply added and averaged. With respect to the solid line of part (B) of FIG. 5, when expressed using the symbols denoting image data appearing on FIG. 1, it is expressed by when $|A(K, I)-C(K-1, I)| \geq 4$, C (K, I)=A (K, I), and when $|A(K, I)-C(K-1, I)| < 4$,

C (K, I)=B (K, I), that is, it is concerned with the embodiment of the present invention. With respect to the broken line of part (B) of FIG. 5, it is always expressed by

C (K, I)=B (K, I), that is, it is concerned with the earlier development shown in FIG. 8.

In the graph of part (A) of FIG. 5 wherein the ideal variation of pixel values is shown, the pixel value is lowered from the maximum value to the minimum value during one clock period of time from time $t_7$ to time $t_8$, and is increased from the minimum value to the maximum value during one clock period of time from time $t_{23}$ to time $t_{24}$. Meanwhile, as to the solid line of part (B) of FIG. 5 (in case of the embodiment shown in FIG. 1), the pixel values are varied during two clock periods of time (time $t_7$ to time $t_9$, and time $t_{23}$ to time $t_{25}$), respectively. Meanwhile, as to the broken line of part (B) of FIG. 5 (in case of the earlier development shown in FIG. 8), it takes a lot of time for a complete variation of the pixel values. From this, it will be understood that the embodiment shown in FIG. 1 is excellent, as compared with the earlier development shown in FIG. 8, in the point of the tracking ability to the movement through the after-image disappearing rapidly.

FIG. 6 is a view showing an alternative result of a simulation when a cyst passes through a pixel point shown in FIG. 4, in a similar fashion to that of FIG. 5. Part (A) of FIG. 6 shows a variation of pixel values before the averaging processing, as the model on the simulation, and part (B) of FIG. 6 shows a variation (a solid line) of pixel values after passing through the image processing unit shown in FIG. 1, of the pixel point, and a variation (a broken line) of pixel values after passing through the image processing unit shown in FIG. 8.

In part (A) of FIG. 6, it is assumed that noises as shown at times $t_9$ and $t_{16}$ are mixedly entered. As shown by the solid line and the broken line shown in part (A) of FIG. 6, it will be understood that the embodiment (solid line) shown in FIG. 1 is excellent, as compared with the earlier development (broken line) shown in FIG. 8, in the point of the reduction of the noises.

As described above, according to the ultrasonic diagnostic apparatus of the present invention, it is possible to obtain an image implementing both the reduction of noises and the tracking ability to the movement with greater satisfaction.

Further, according to the filter of the present invention, it is possible to implement a small-scaled circuit of filter having both an IIR filter and a minimum structure of FIR filter.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. An ultrasonic diagnostic apparatus in which transmission of ultrasonic waves into a subject, and reception of the ultrasonic waves reflected within the subject, are repeatedly performed to obtain a plurality of sequentially continued frames of image data, wherein a dynamic image is displayed in accordance with the image data thus obtained, said ultrasonic diagnostic apparatus comprising:

a first filter performing an average arithmetic operation between an immediately previous frame of image data and a new frame of image data independently for each image segment obtained when said dynamic image is divided into a plurality of image segments, each including at least one pixel; and a second filter performing an averaging arithmetic operation between an averaging image data, which has been generated through the averaging arithmetic operation already performed using the immediately previous frame of image data, and the new frame of image data, wherein at least one of the averaging arithmetic operation by said first filter and the averaging arithmetic operation by said second filter are selected for each of said image segments in accordance with a variation in a value of image data on each of said image segments, over the plurality of frames.

2. An ultrasonic diagnostic apparatus in which transmission of ultrasonic waves into a subject, and reception of the ultrasonic waves reflected within the subject, are repeatedly performed to obtain a plurality of sequentially continued frames of image data, wherein a dynamic image is displayed in accordance with the image data thus obtained, said ultrasonic diagnostic apparatus comprising:

an image processing unit comprising a storage unit storing a frame of image data;

an average arithmetic operation unit receiving the image data read from said storage unit and a new frame of image data to perform an average arithmetic operation thereby generating an averaging image data;

a data selection unit receiving the averaging image data generated in said average arithmetic operation unit and a new frame of image data to select either one of the image data received in accordance with a predetermined data selection signal for each of the image segments obtained when said dynamic image is divided into a plurality of image segments each including at least one pixel, and to transmit the image data thus selected to said storage unit;

a selection control unit receiving at least one of the image data read from said storage unit and the new frame of image data to generate the data selection signal in accordance with a predetermined first criterion and transmit the data selection signal to said data selection unit; and an image display unit displaying an image based on the averaging image data generated in said average arithmetic operation unit.

3. An ultrasonic diagnostic apparatus according to claim 2, wherein said selection control unit receives the image data read from said storage unit and the new frame of image data, and said selection control unit generates the data selection signal to instruct to select for each of the image segments the averaging image data or the new frame of image data of the image data received by said data selection unit as difference data, which is obtained by subtracting the image data associated with the image segment of the image data read from said storage unit and received by said selection control unit, is less than a first threshold or not, from the image data associated with the image segment of the new frame of image data received by said control selection unit, is less than a first threshold or not, and transfers the data selection signal generated to said data selection unit.

4. An ultrasonic diagnostic apparatus according to claim 2, wherein said selection control unit receives the image data read from said storage unit and the new frame of image data, and said selection control unit generates the data selection signal to instruct to select for each of the image segments the averaging image data or the new frame of image data of the image data received by said data selection unit as difference data, which is obtained by subtracting the image data associated with the image segment of the new frame of image data received by said selection control unit, is less than a second threshold or not, from the image data associated with the image segment of the image data read from said storage unit and received by said control selection unit, is less than a second threshold or not, and transfers the data selection signal generated to said data selection unit.

5. An ultrasonic diagnostic apparatus according to claim 2, wherein said selection control unit receives at least the image data read from said storage unit, of the image data read from said storage unit and the new frame of image data, and said selection control unit generates the data selection signal to instruct to select for each of the image segments the averaging image data or the new frame of image data of the image data received by said data selection unit as the image data associated with the image segment of the image data read from said storage unit and received by said control selection unit is less than a third threshold or not, and transfers the data selection signal generated to said data selection unit.

6. An ultrasonic diagnostic apparatus according to claim 2, wherein said selection control unit receives at least the new frame of image data, of the image data read from said storage unit and the new frame of image data, and said selection control unit generates the data selection signal to instruct to select for each of the image segments the averaging image data or the new frame of image data of the image data received by said data selection unit as the image data received by said control selection unit is less than a fourth threshold or not, and transfers the data selection signal generated to said data selection unit.

7. An ultrasonic diagnostic apparatus according to claim 2, wherein said average arithmetic operation unit performs a weighting average arithmetic operation for an associated pixel-to-pixel of said image data received into said average arithmetic operation unit.

8. An ultrasonic diagnostic apparatus according to claim 7, wherein said selection control unit generates the data selection signal, and generates a factor selection signal to select a weighting factor in the weighting average arithmetic operation for each of the image segments in accordance with a predetermined second criterion, and said average arithmetic operation unit performs the weighting average arithmetic operation, while selecting a weighting factor for each of the image segments in accordance with the factor selection signal transmitted from said selection control unit.

9. An ultrasonic diagnostic apparatus according to claim 8, wherein said selection control unit receives the image data read from said storage unit and the new frame of image data, and said selection control unit generates the factor selection signal to select for each of the image segments a smaller weight as weight for the image data read from said storage unit and a larger weight for the new frame of image data as a difference between the image data associated with the image segment of the new frame of image data received by said selection control unit and the image data associated with the image segment of the image data read from said storage unit and received by said selection control unit is larger in value, and transfers the factor selection signal generated to said average arithmetic operation unit.

10. An ultrasonic diagnostic apparatus according to claim 9, wherein said selection control unit generates the factor selection signal to select a weighting factor for each of the image segments to alter more promptly a weight of the image data read from said storage unit to a small weight and alter more promptly a weight of the image data of the new frame of image data to a large weight, as an absolute value of a difference, the difference of which is obtained by subtracting the image data associated with the image segment of the image data read from said storage unit and received by said selection control unit, from the image data associated with the image segment of the image data read out from said storage unit and received by said selection unit, from the image data associated with the image segment of the new frame of image data received by said selection control unit, is larger as compared with a case where the difference is positive, in a case where the difference is negative, even if the absolute value of the difference is identical, and transfers the factor selection signal thus generated to said average arithmetic operation unit.

11. An ultrasonic diagnostic apparatus according to claim 8, wherein said selection control unit receives at least the image data read from said storage unit, of the image data read from said storage unit and the new frame of image data, and said selection control unit generates the factor selection signal to select a smaller weight as a weight of the image data read from said storage unit for each of the image segments and selects a larger weight as a weight of the new frame of the image data with a larger value of the image data associated with the image segment of the image data read from said storage unit and received by said selection control unit, and transfers the factor selection signal generated to said average arithmetic operation unit.

* * * * *